United States Patent
Li et al.

(10) Patent No.: US 11,016,332 B2
(45) Date of Patent: May 25, 2021

(54) DISPLAY PANEL AND DISPLAY DEVICE

(71) Applicant: BOE TECHNOLOGY GROUP CO., LTD., Beijing (CN)

(72) Inventors: Zhongxiao Li, Beijing (CN); Xiaochuan Chen, Beijing (CN); Wenqing Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/642,515

(22) PCT Filed: Sep. 3, 2019

(86) PCT No.: PCT/CN2019/104130
§ 371 (c)(1),
(2) Date: Feb. 27, 2020

(87) PCT Pub. No.: WO2020/052466
PCT Pub. Date: Mar. 19, 2020

(65) Prior Publication Data
US 2021/0088837 A1  Mar. 25, 2021

(30) Foreign Application Priority Data
Sep. 10, 2018  (CN) .......................... 201811049615.8

(51) Int. Cl.
*G02F 1/1335* (2006.01)
*G02F 1/13357* (2006.01)
*G02F 1/1343* (2006.01)

(52) U.S. Cl.
CPC .... *G02F 1/133526* (2013.01); *G02F 1/13362* (2013.01); *G02F 1/133512* (2013.01);
(Continued)

(58) Field of Classification Search
CPC ............. G02B 27/0955; H01L 51/5275; G02F 1/13756; G02F 1/133565; G02F 1/13362; G02F 1/133526
See application file for complete search history.

(56) References Cited

U.S. PATENT DOCUMENTS

| | | |
|---|---|---|
| 5,844,645 A | 12/1998 | Kashimoto |
| 8,817,199 B2 | 8/2014 | Guo et al. |

(Continued)

FOREIGN PATENT DOCUMENTS

| | | |
|---|---|---|
| CN | 101852942 A | 10/2010 |
| CN | 102707343 A | 10/2012 |

(Continued)

OTHER PUBLICATIONS

"First Office Action and English language translation", CN Application No. 201811049615.8, dated Aug. 27, 2020, 15 pp.

*Primary Examiner* — Michael H Caley
*Assistant Examiner* — Mariam Qureshi
(74) *Attorney, Agent, or Firm* — Myers Bigel, P.A.

(57) ABSTRACT

A display panel including a plurality of pixel units is provided. The display panel includes: a first substrate and a second substrate opposite to each other a first light-shielding layer including a plurality of first openings as light-transmitting regions for the pixel units, and a liquid crystal layer between the first substrate and the second substrate. Each pixel unit includes a first electrode, a second electrode and a lens. The first electrode and the second electrode are configured to form an electric field in response to receiving a voltage, the electric field is configured to drive liquid crystal molecules of the liquid crystal layer to deflect to change a ratio of transmission and reflection of linearly polarized light incident onto the liquid crystal layer at the light incident surface of the lens.

20 Claims, 5 Drawing Sheets

(52) U.S. Cl.
CPC .. *G02F 1/133514* (2013.01); *G02F 1/134309* (2013.01); *G02F 1/133565* (2021.01)

(56) References Cited

U.S. PATENT DOCUMENTS

| | | | |
|---|---|---|---|
| 2007/0127348 A1* | 6/2007 | Ooi | G02B 3/08 369/112.02 |
| 2007/0153160 A1* | 7/2007 | Lee | G02F 1/133516 349/95 |
| 2013/0155337 A1* | 6/2013 | Sugiyama | H04N 13/32 349/15 |
| 2013/0235304 A1 | 9/2013 | Lee | |
| 2013/0342512 A1 | 12/2013 | Smith et al. | |
| 2015/0036209 A1* | 2/2015 | Ichihashi | G02F 1/133526 359/315 |
| 2017/0168223 A1 | 6/2017 | Feng | |
| 2019/0129239 A1 | 5/2019 | Li et al. | |
| 2019/0278129 A1 | 9/2019 | Zhu et al. | |
| 2019/0278131 A1 | 9/2019 | Li et al. | |

FOREIGN PATENT DOCUMENTS

| | | |
|---|---|---|
| CN | 104350417 A | 2/2015 |
| CN | 104483798 A | 4/2015 |
| CN | 104932145 A | 9/2015 |
| CN | 103080821 B | 11/2015 |
| CN | 106707608 A | 5/2017 |
| CN | 206584147 U | 10/2017 |
| CN | 107632451 A | 1/2018 |
| CN | 108508636 A | 9/2018 |
| WO | 2013161304 A1 | 10/2013 |

* cited by examiner

DISPLAY PANEL AND DISPLAY DEVICE

CROSS REFERENCE TO RELATED APPLICATIONS

This application is a 35 U.S.C. 371 national stage application of a PCT International Application No. PCT/CN2019/104130, filed on Sep. 3, 2019, which claims priority of a Chinese patent application No. 201811049615.8 filed on Sep. 10, 2018, the entire disclosures of which are incorporated herein by reference.

TECHNICAL FIELD

The present disclosure relates to the field of display technologies, and in particular, to a display panel and a display device.

BACKGROUND

Liquid crystal displays are being widely applied at present. They have advantages such as high color gamut, thinness and lightness, and quick response. Technologies for the liquid crystal displays in theoretical research and practical processes are quite mature. The image display of the liquid crystal display is realized by virtue of optical anisotropy and polarization property of liquid crystal molecules, that is, polarization states of polarized light are modulated by the liquid crystal to perform displaying. Generally, a liquid crystal display panel needs to be provided with two polarizing films, one of which serves as a polarizer, and the other of which is used as an analyzer. Moreover, polarization directions of the two polarizing films are orthogonal. By changing the polarization state of light with the liquid crystal, some of the linearly polarized light can exit the polarizer, and some of the linearly polarized light cannot exit the polarizer. In practice, the process of attaching a polarizing film to a liquid crystal display panel may cause problems such as bubbles and binding deviations, thereby affecting the image display quality and reducing the reliability of the display device.

SUMMARY

In an aspect, the disclosure provides a display panel comprising a plurality of pixel units. The display panel comprises: a first substrate and a second substrate opposite to each other, a side of the first substrate facing away the second substrate being a light exiting side of the display panel, and a side of the second substrate facing away the first substrate being a light incident side of the display panel; a first light-shielding layer on the first substrate, the first light-shielding layer comprising a plurality of first openings as light-transmitting regions for the pixel units, and a liquid crystal layer between the first substrate and the second substrate. Each pixel unit of the plurality of pixel units comprises a first electrode, a second electrode and a lens, the lens is arranged on a side of the first substrate facing the second substrate and extends toward the second substrate. The lens comprises a light incident surface and a light exiting surface, and the light incident surface of the lens is in direct contact with the liquid crystal layer. The first electrode and the second electrode are configured to form an electric field in response to receiving a voltage, the electric field is configured to drive liquid crystal molecules of the liquid crystal layer to deflect to change a ratio of transmission and reflection of linearly polarized light incident onto the liquid crystal layer at the light incident surface of the lens, thereby changing a ratio of the linearly polarized light exiting from a light-transmitting region of the light-transmitting regions and the linearly polarized light absorbed by the first light shielding layer.

According to some exemplary embodiments of the disclosure, the lens is arranged in the light-transmitting region of the pixel unit.

According to some exemplary embodiments of the disclosure, an orthographic projection of each of the plurality of first openings on the first substrate is within an orthographic projection of the light exiting surface of the lens on the first substrate.

According to some exemplary embodiments of the disclosure, the display further comprises a second light-shielding layer on a side of the liquid crystal layer facing away the first substrate, the second light-shielding layer comprises a plurality of second openings, and an orthographic projection of each of the plurality of second openings on the first substrate is within an orthographic projection of each of the plurality of first openings on the first substrate.

According to some exemplary embodiments of the disclosure, the display panel further comprises a barrier located in a light-shielding region of the first light-shielding layer and extending from the first substrate toward the second substrate, an orthographic projection of the barrier on the first substrate does not overlap with an orthographic projection of the lens on the first substrate.

According to some exemplary embodiments of the disclosure, the lens is arranged in a light-shielding region of the pixel unit, the display panel further comprises a second light-shielding layer on a side of the liquid crystal layer facing away the first substrate, the second light-shielding layer comprises a plurality of second openings, and an orthographic projection of each of the plurality of second openings on the first substrate is within an orthographic projection of a light-shielding region of the first light-shielding layer on the first substrate.

According to some exemplary embodiments of the disclosure, the lens comprises any one selected from a group consisting of a cylinder lens, a taper lens and a mesa lens.

According to some exemplary embodiments of the disclosure, the lens comprises a right angle prism, a main cross section of the right angle prism comprises a right triangle, wherein a plane where a hypotenuse of the right triangle of the main cross section of the right angle prism is located comprises the light incident surface, and a plane where a cathetus of the right triangle of the main cross section of the right angle prism that is parallel to the first substrate is located comprises the light exiting surface.

According to some exemplary embodiments of the disclosure, the lens is made of resin or quartz.

According to some exemplary embodiments of the disclosure, an initial direction of a long axis of the liquid crystal molecules in the liquid crystal layer is parallel to the first substrate, a refractive index $n_1$ of the lens is equal to $n_O$, $n_O$ is an o-light refractive index of liquid crystal molecules in the liquid crystal layer.

According to some exemplary embodiments of the disclosure, an angle $\alpha$ between a tangent plane for any point on the light incident surface of the lens and the light exiting surface of the lens satisfies $$\alpha \geq \arcsin\left(\frac{n_1}{n_e}\right)$$

where $n_1$ is the refractive index of the lens, and $n_e$ is an e-light refractive index of liquid crystal molecules in the liquid crystal layer.

According to some exemplary embodiments of the disclosure, an initial direction of a long axial of the liquid crystal molecules is parallel to a plane where the hypotenuse of the right triangle of the main cross section of the right angle prism is located.

According to some exemplary embodiments of the disclosure, an angle between the light incident surface of the right angle prism and the light exiting surface of the right angle prism is θ, and $$\theta = \arcsin\left(\frac{n_2}{n_e}\right),$$

where $n_2$ is a refractive index of the right angle prism, and $n_e$ is an e-light refractive index of liquid crystal molecules in the liquid crystal layer.

According to some exemplary embodiments of the disclosure, the first electrode comprises a common electrode and is connected to a reference voltage, and the second electrode comprises a pixel electrode, the first electrode is on the first substrate, and the second electrode is on the second substrate.

According to some exemplary embodiments of the disclosure, the first electrode comprises a common electrode and is connected to a reference voltage, and the second electrode comprises a pixel electrode, both the first electrode and the second electrode are on one of the first substrate and the second substrate.

According to some exemplary embodiments of the disclosure, the display panel further comprises a color filter layer in the light-transmitting region of the first substrate.

According to some exemplary embodiments of the disclosure, a difference between an e-light refractive index and an o-light refractive index of the liquid crystal molecules in the liquid crystal layer is greater than or equal to 0.3.

Another aspect of the disclosure provides a display device, comprising the display panel according to any one of the foregoing embodiments, and a backlight on the side of the second substrate facing away the first substrate.

According to an exemplary embodiment of the disclosure, the backlight is configured to provide linearly polarized light whose polarization direction is parallel to an initial direction of a long axis of the liquid crystal molecules in the liquid crystal layer.

BRIEF DESCRIPTION OF DRAWINGS

In order to explain the technical solution in the embodiments of the disclosure more clearly, the drawings for illustrating the embodiments will be briefly introduced below. The drawings related in the following description are just some embodiments of the disclosure. Other drawings can be obtained by those of ordinary skill in the art based on these drawings without inventive efforts.

DETAILED DESCRIPTION OF EMBODIMENTS

The technical solutions of the embodiments of present disclosure will be clearly and fully described below in connection with the drawings. The described embodiments are only a part of possible embodiments of the disclosure, rather than all of them. Based on the embodiments discussed herein, all other embodiments obtained by a person of ordinary skill in the art without creative efforts fall within the protection scope of the application.

Figure 1:
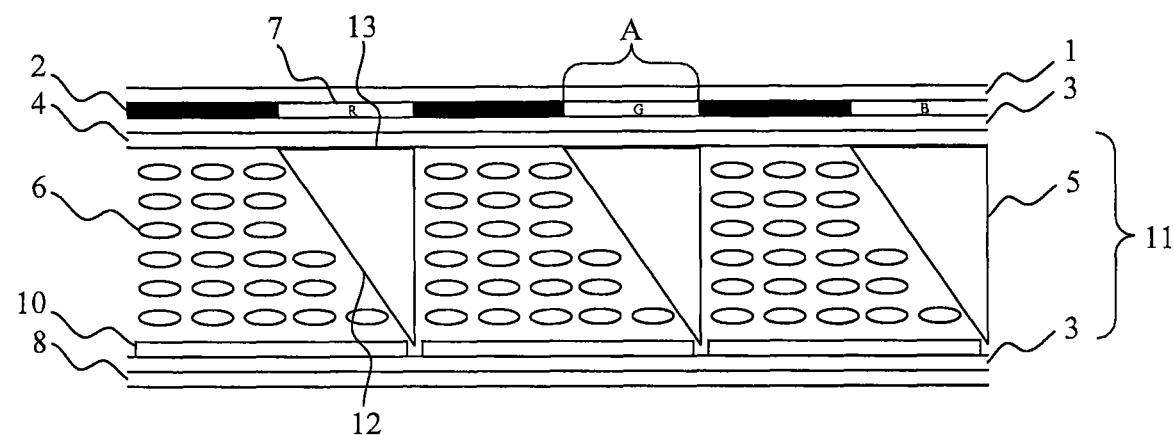
FIG. 1 illustrates a structure of a display panel according to an embodiment of the disclosure.

As shown in FIG. 1, a display panel provided by an embodiment of the disclosure includes a plurality of pixel units. The display panel includes a first substrate 1 and a second substrate 8 opposite to each other. A side of the first substrate 1 facing away the second substrate 8 serves as a light exiting side of the display panel. A side of the second substrate 8 facing away the first substrate 1 is a light incident side of the display panel. A first light-shielding layer 2 is disposed on the first substrate 1. The first light-shielding layer 2 is provided with a plurality of first openings A as light-transmitting regions of respective pixel units. The display panel further includes a liquid crystal layer 11 between the first substrate 1 and the second substrate 8. The pixel unit includes a first electrode 4, a second electrode 10, and a lens 5 disposed on a side of the first substrate facing the second substrate and extending toward the second substrate. The lens 5 includes a light incident surface 12 and a light exiting surface 13, the light incident surface 12 of the lens is in direct contact with the liquid crystal layer 11.

During operation of the display panel, a voltage is respectively applied to the first electrode 4 and the second electrode 10 to form an electric field, and the electric field drives liquid crystal molecules 6 in the liquid crystal layer 11 to deflect to change a ratio of transmission and reflection of light incident on the light incident surface 12 of the lens 5, which in turn changes a ratio of light exiting from the first light-transmitting region A and light absorbed by the first light-shielding layer 2, thereby achieving bright display and dark display for the display panel.

In the display panel of the embodiments herein, no polarizing film is provided on the first substrate 1 and second substrate 8, instead, the lens 5 is arranged in the liquid crystal layer 11 of the display panel. The refractive index of the liquid crystal layer can be changed by adjusting the direction of deflection of the liquid crystal molecules 6, so that light that is incident on an interface (i.e. the light incident surface 12) between the liquid crystal layer and the lens 5 is transmitted, refracted or reflected, achieving modulation to the incident light. In this manner, the embodiment of the disclosure may avoid the problem such as bubbles and binding deviations that may occur during the process of attaching a polarizing film to the display panel, thereby improving the reliability for the display panel, and reducing the usage of polarizing film, which also reduces manufacturing cost.

In some exemplary embodiments, as shown in FIG. 1, the lens 5 may be disposed in the light-transmitting region of the pixel unit. In this case, an orthographic projection of the first light-transmitting region A on the first substrate 1 is within an orthographic projection of the light exiting surface 13 of the lens 5 on the first substrate 1 to prevent an occurrence of light leakage at an edge of the first light-transmitting region A when the display panel is in a full black display state.

Figure 3:
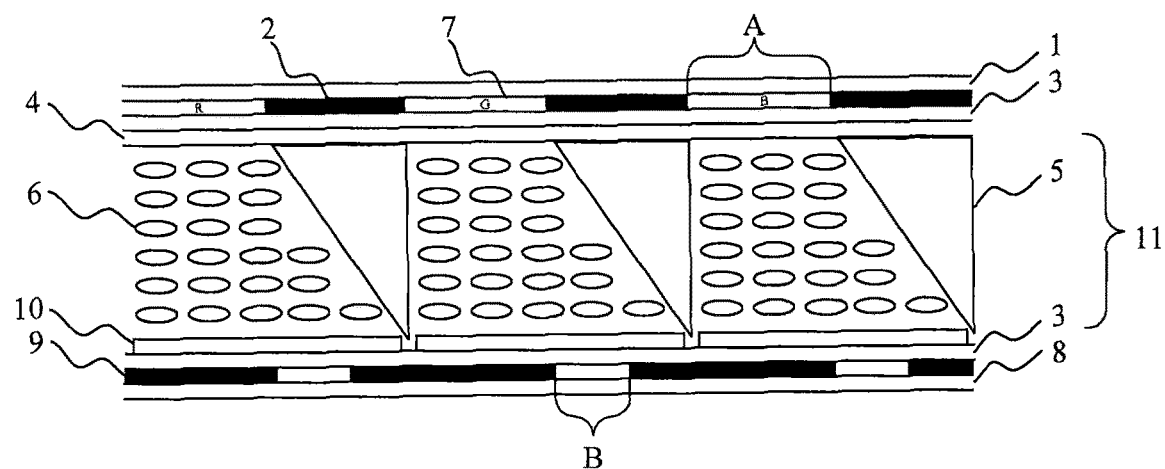
FIG. 3 illustrates a structure of a display panel according to another embodiment of the disclosure.

Alternatively, in some exemplary embodiments, as shown in FIG. 3, the lenses 5 may be distributed in light-shielding regions of the pixel units. In this case, the display panel further includes a second light-shielding layer 9 between the second substrate 8 and the second electrode 10. The second light-shielding layer 9 is provided with a plurality of second openings B as light incident openings for the pixel units, an orthogonal projection of the second opening B on the first substrate 1 is within an orthogonal projection of a light-shielding region of the first light-shielding layer 2 on the first substrate 1.

As an example, the first light-shielding layer 2 and the second light-shielding layer 9 may be a black matrix. In practice, if the lenses 5 are distributed in the light-transmitting regions of the first light-shielding layer 2, the display panel functions as a normally black display panel. If the lenses 5 are distributed in the light-shielding regions of the first light-shielding layer 2, the display panel functions as a normally white display panel. As used herein, a "Normally Black (NB)" display panel means when no voltage is applied to the display panel, the display panel is unable to transmit light so that the display panel appears to be black. In contrast, a "Normally White (NW)" display panel means that the display panel is able to transmit light even if no voltage is applied to the display panel so that the display panel appears to be displaying bright white image. Correspondingly, as used in the present disclosure, the term "a full black display state" means a display state that the display panel is unable to transmit light and thus displays a full black image. The term "a full white display state" means a display state that the display panel is full light-transmissive and thus displays a full white image. The term "grayscale display" indicates a display state that the display panel is partially light-transmissive and thus displays an image between the full black state and the full white state. For example, for a display panel with a gray scale ranging from 0 to 255, the full black display state refers to a display state where each sub-pixel is at L0 (i.e., the gray scale is 0), and the full white display state means each sub pixels is at L255 (i.e., the gray scale is 255), and the grayscale display state means that each sub-pixel is at L1 to L254 (i.e., the gray scale ranges from 1 to 254). Further, a bright state of the display panel includes both the full white display state and gray scale display state.

Figure 4:
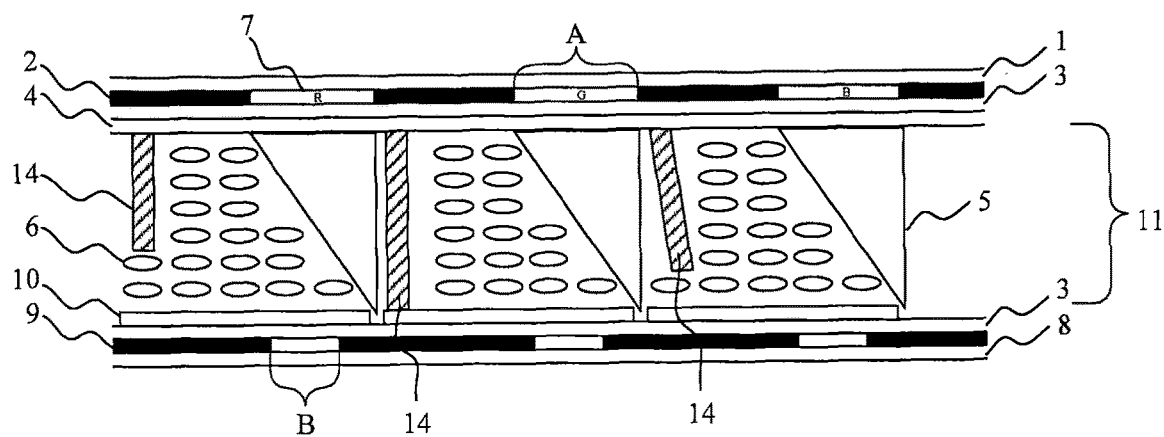
FIG. 4 illustrates a structure of a display panel according to another embodiment of the disclosure.

FIG. 4 illustrates a structural diagram of a display panel according to another embodiment of the disclosure. As shown in FIG. 4, the lenses 5 are distributed in the light-transmitting regions of the first light-shielding layer 2. Compared with the display panel shown in FIG. 1, the display panel further includes a barrier 14 disposed in the light-shielding region of the first substrate 1 and extending from the first electrode 4 to the second electrode 10. An orthographic projection of the barrier 14 on the first substrate 1 does not overlap an orthographic projection of the lens 5 on the first substrate 1. With the barrier 14, it is enabled that light deflected by the lens 5 is absorbed by the first light-shielding layer 2 and the barrier 14, that is, the barrier 14 facilitates absorption of some of the deflected light, instead of exiting from the first opening A in an adjacent pixel unit. As shown in FIG. 4, a height of the barrier 14 in a direction perpendicular to the first substrate 1 is less than or equal to a vertical distance between the first electrode 4 and the second electrode 10. Further, the barrier 14 may be arranged to be perpendicular to the first substrate 1, alternatively, it can be inclined with respect to the direction perpendicular to the first substrate 1. The shape and inclined angle of the barrier 14 are not limited herein.

Optionally, in an exemplary embodiment, as shown in FIG. 4, the display panel further includes a second light-shielding layer 9 between the second substrate 8 and the second electrode 10. A plurality of second openings B are arranged in the second light-shielding layer 9 and serve as light incident openings of the pixel units. For each pixel unit, an orthographic projection of the second opening B on the first substrate 1 is within an orthographic projection of the first opening A on the first substrate 1. The second light-shielding layer 9 can limit the position where the light is incident, thereby achieving a better control to incident light and preventing the display panel from leaking light in case of a full black display state. Meanwhile, the second opening B enables all the incident light to hit onto the light incident surface 12 of the lens 5, thereby ensuring that the lens 5 can transmit, refract or reflect all the incident light, which would increase the utilization of light.

In practice, the light (e.g., backlight) incident from a side of the second substrate 8 includes a small amount of oblique stray light, divergent angular light, and the like. For a display panel without the second light-shielding layer 9, especially a display panel without a barrier 14, most light is incident from the light incident surface 12 of the lens 5, the stray light in the incident light, or the stray light reflected by the light incident surface 12 of the lens 5 may transmit through a non-light incident surface (e.g., a side of the right angle prism 5 perpendicular to the first substrate 1 and the second substrate 8) of another lens adjacent to the lens 5 and enter an adjacent pixel unit, which would affect the display effect.

In view of this, by providing the second opening B in the second substrate 8, the position where the light is incident can be restricted, so that the incident light can fully hit onto the light incident surface 12 of the lens 5 without leakage of stray light. In this case, as described above, the orthographic projection of the first opening A on the first substrate 1 is within the orthographic projection of the light exiting surface 13 of the lens 5 on the first substrate 1, alternatively, by having the orthographic projection of the light exiting surface 13 of the lens 5 on the first substrate 1 fall within the orthographic projection of the first opening A on the first substrate 1, it is enabled that light incident from the second opening B exits from a corresponding first opening A, so as to ensure that sufficient light exits from the display panel, thereby improving display effect.

For the embodiments shown in FIGS. 1 to 4, the display panel may optionally include an insulating layer 3 between the first light-shielding layer 2 and the first electrode 4 and between the second electrode 10 and the second substrate 8, for providing better electrical insulation properties.

It should be noted that although the lens 5 is schematically shown as a right angle prism in FIGS. 1 to 4, the present disclosure is not so limited. In practice, the lens 5 may be cylindrical, tapered, or mesa-shaped. The specific shape and type of the lens 5 are not limited herein, and those skilled in the art may select a suitable lens according to actual conditions.

Typically, the plane of the prism where light is incident or exits is called a side surface, and a plane perpendicular to the side surface is called a main cross section. According to the shape of the main cross section, the prism can be classified into a triangular prism, a right angle prism, a pentagonal prism, and the like. The main cross section of a right angle prism is a right angle triangle. In case of utilizing a right angle prism as the lens 5, as shown in FIG. 1, the surface where the hypotenuse of the right angle triangle of the main cross section of the right angle prism is located is the light incident surface 12, and the surface where the cathetus of the right angle triangle of the main cross section of the right angle prism that is parallel to the first substrate 1 is located is the light exiting surface 13.

In some embodiments, the lens 5 may include resin, quartz, or the like.

In some embodiments, an initial direction of the long axis of the liquid crystal molecules 6 in the liquid crystal layer 11 is parallel to the first substrate 1. As used in herein, "initial" refers to the fact that an electric field is not generated by applying different voltages to the first electrode 4 and the second electrode 10 (i.e., the voltage difference between the first electrode 4 and the second electrode 10 is zero). In such an embodiment, the refractive index of the lens 5 $n_1$ is equal to $n_o$, where $n_o$ represents an o-light refractive index of the liquid crystal molecules 6 in the liquid crystal layer 11. The refractive index $n_1$ of the lens 5 may be slightly larger than or slightly smaller than the o-light refractive index of the liquid crystal molecules 6, for example, the refractive index $n_1$ of the lens 5 is equal to $n_o \pm 0.05$.

In some embodiments, the light incident surface 12 of the lens 5 may be a flat, curved or polygonal slope, and an angle $\alpha$ between a tangent plane for an arbitrary point on the light incident surface 12 of the lens 5 and the light exiting surface 13 of the lens 5 satisfies the following formula:

$$\alpha \geq \arcsin\left(\frac{n_1}{n_e}\right)$$

where $n_1$ is the refractive index of the lens 5, $n_e$ represents an e-light refractive index of the liquid crystal molecules 6 in the liquid crystal layer 11.

If light is incident into a mineral medium, birefringence phenomenon generally occurs so that light is decomposed into two polarized light that have different propagation velocity and vibrate in two mutually perpendicular directions, i.e. the ordinary light (o-light) obeying the law of refraction and the extraordinary light (e-light) which does not obey the law of refraction. The o-light propagating along different directions has the same speed and refractive index, while the e-light propagating along different directions has different speeds and refractive indexes. Liquid crystals exhibit birefringent property due to refractive index anisotropy, which is determined by the ordered arrangement of anisotropic liquid crystal molecules. If the external electric field applied to the liquid crystal molecules changes, the arrangement of the liquid crystal molecules also changes, resulting in changes in their refractive characteristics.

Since the actual light incident for the display panel is not of a single angle, instead, it has a small divergence angle, the greater the difference between the e-light refractive index and the o-light refractive index of the liquid crystal molecules 6, the more favorable it is to accommodate a larger incident light divergence angle, which makes it easier to have the incident light totally reflected. In some embodiments, the difference between the e-light refractive index and the o-light refractive index of the liquid crystal molecules 6 in the liquid crystal layer 11 is greater than or equal to 0.3.

In some embodiments, an initial direction of the long-axis of the liquid crystal molecules 6 is parallel to the plane (i.e., the light incident surface 12) where the hypotenuse of the right angle triangle of the main cross section of the right angle prism is located. In a specific example, the direction of the long axis of the liquid crystal molecules 6 can be controlled by disposing an alignment layer or doping an alignment agent in the liquid crystal layer 11, so that it is parallel to the plane where the hypotenuse of the right angle triangle of the main cross section of the right angle prism is located. Therefore, in a case where the voltage difference between the first electrode 4 and the second electrode 10 is zero, the liquid crystal molecules 6 may not be affected by the slope of the right angle prism.

Figure 5:
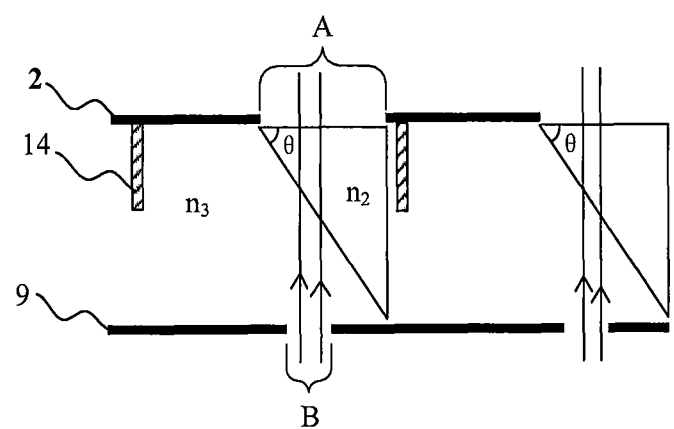
FIG. 5 illustrates light propagation in a display panel that is in a full white display state according to an embodiment of the present disclosure.

In an exemplary embodiment, as shown in FIG. 5, an angle between the light incident surface of the right angle prism and light exiting surface of the right angle prism is $$\theta = \arcsin\left(\frac{n_2}{n_e}\right),$$

where $n_2$ is the refractive index of the right angle prism, and $n_e$ is the e-light refractive index of the liquid crystal molecules in the liquid crystal layer.

The above-mentioned angle $\theta$ means an acute angle formed by the light exiting surface of the right angle prism and the light incident surface of the right angle prism.

Figure 6:
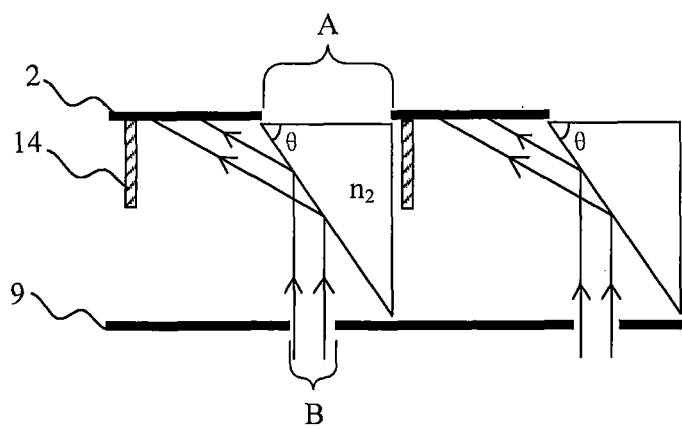
FIG. 6 illustrates light propagation in a display panel that is in a full black display state according to an embodiment of the present disclosure.

Assuming the refractive index of the right angle prism is $n_2$, the refractive index of the liquid crystal layer is $n_3$, where $n_o \leq n_3 \leq n_e$, as shown in FIG. 5, if $n_3=n_2$, light would directly transmit through the right angle prism, thereby achieving the full white display. As shown in FIG. 6, when $n_3>n_2$ and the incident light satisfies a total reflection condition, the light is totally reflected, which in turn reaches the first light-shielding layer 2 and is absorbed, thereby realizing the full black display.

As used herein, the refractive index of the liquid crystal layer means an equivalent refractive index or an average refractive index of the liquid crystal layer. In case the liquid crystal molecules 6 of the liquid crystal layer are arranged in a same direction and subjected to a vertical electric field, the equivalent refractive index of the liquid crystal layer is consistent with the refractive index currently exhibited by the liquid crystal molecules 6.

In some embodiments, the first electrode 4 may be a transparent planar common electrode connected to a reference voltage. Accordingly, the second electrode 10 may be a transparent strip pixel electrode. In the embodiment shown in FIG. 1, the first electrode 4 is located on the first substrate 1, and the second electrode 10 is located on the second substrate 8. Alternatively, the first electrode 4 and the second electrode 10 may both be located on the first substrate 1 or both located on the second substrate 8. The position where the first electrode 4 and the second electrode 10 are arranged is not limited, as long as a voltage difference capable of deflecting the liquid crystal molecules 6 can be generated.

In some embodiments, by controlling the width of each first light-shielding layer 2 in a direction parallel to the first substrate 1, the light deflected by the lens 5 can be absorbed by the first light-shielding layer. As an example, the width of the first light-shielding layer may be larger than a height of the liquid crystal layer 11 that is perpendicular to the first substrate 1, in this way, reflected light that forms an angle less than 45° with the first substrate is absorbed by the first light-shielding layer 2, while reflected light that forms an angle greater than 45° with the first substrate would not exit since the incident angle is usually larger than the critical angle of total reflection between the first substrate (typically made of glass material) and the ambient air.

In an exemplary embodiment, the o-light refractive index of the liquid crystal molecules is 1.5, the e-light refractive index is 1.8, the vertex angle of the right angle prism is 30°, the prism height is equal to the height of the liquid crystal layer height, i.e., 17 microns, the first opening has a width of 10 microns, and the first light-shielding layer has a width of 18.9 microns.

In case of a colorful display panel, the first opening includes a color filter layer 7, as shown in FIGS. 1 to 4, for providing a color display.

Next, a structure and display principle of the display panel of the embodiment herein will be discussed in detail by taking a normally black display panel with a prism being in the light-transmitting region and being a right angle prism as an example.

As shown in FIG. 1, the display panel comprises a red (R) pixel unit, a green (G) pixel unit and a blue (B) pixel unit. Specifically, the display panel comprises a first substrate 1, a first light-shielding layer 2, a first electrode 4, a liquid crystal layer 11, a second electrode 10 and a second substrate 8. The first light-shielding layer 2 comprises a first opening A where a color filter 7 is disposed.

The liquid crystal layer 11 is arranged between the first substrate 1 and the second substrate 8. A right angle prism is disposed in a region of the liquid crystal layer 11 corresponding to the first opening A. The right angle prism 5 has a refractive index $n_2$ that is equal to the o-light refractive index of the liquid crystal molecules 6 in the liquid crystal layer 11 and smaller than the e-light refractive index of the liquid crystal molecules 6. The difference between the e-light refractive index and the o-light refractive index of the liquid crystal molecules 6 is greater than or equal to 0.3, e.g., the difference may be 0.3, 0.35, 0.4, or the like. Light incident onto the display panel is linearly polarized light whose polarization direction is parallel to the initial direction of the long axis of the liquid crystal molecules. When the polarized light enters the display panel from the second substrate 8, the liquid crystal molecules are deflected by adjusting a voltage difference between the first electrode 4 and the second electrode 10 on either side of the liquid crystal layer 11, so that the liquid crystal layer 11 exhibits a refractive index different from the initial refractive index, which enables the incident light to be reflected, refracted, or transmitted at the light incident surface of the right angle prism, resulting in part of the light is absorbed by the first light-shielding layer 2 and another part of the light exits from the first opening, thereby achieving bright and dark display.

Figure 2:
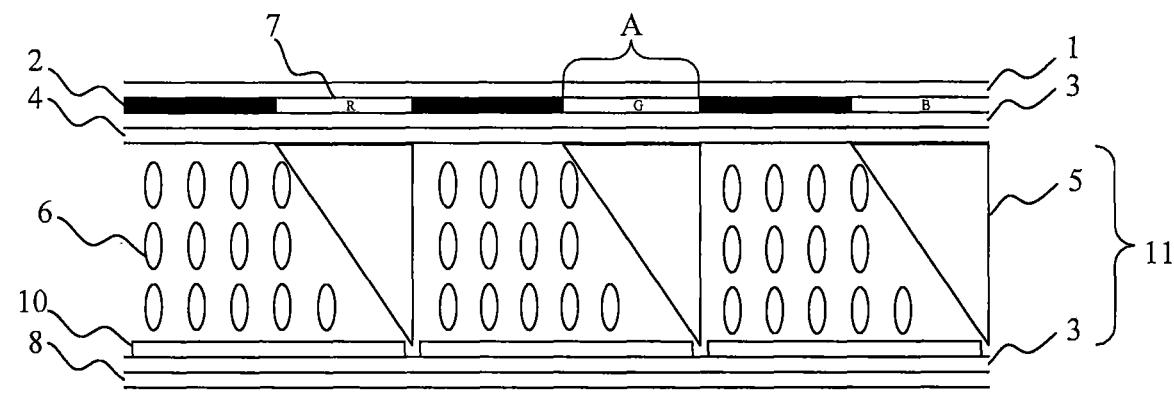
FIG. 2 illustrates the display panel of FIG. 1 when a backlight is allowed to be transmitted.

When no voltage is applied to the first electrode 4 and the second electrode 10, the liquid crystal molecules are in an initial state, as shown in FIG. 1, where the direction of the long axis of the liquid crystal molecules 6 is parallel to the first substrate 1 and the second substrate 8, and is also parallel to the plane (that is, the light incident surface 12) where the hypotenuse of the right angle triangle of the main cross section of the right angle prism is located. The propagation direction of the incident light is perpendicular to the first substrate 1 and the second substrate 8, and the polarization direction of the incident light is parallel to the initial direction of the long axis of the liquid crystal molecules. As shown in FIG. 6, when the light is incident onto the light incident surface 12 of the right angle prism, the refractive index of the liquid crystal layer is equal to the e-light refractive index of the liquid crystal molecules 6, thus the incident light is totally reflected, and the reflected light is absorbed by the first light-shielding layer 2. Therefore, the display panel is in a full black display state. When a voltage is applied to the first electrode 4 and the second electrode 10, as shown in FIGS. 2 and 5, the liquid crystal molecules 6 deflect and stand up. At this point, the liquid crystal layer has a refractive index that is equal to the o-light refractive index of the liquid crystal molecules 6, thus the light incident onto the light incident surface 12 transmits through the right angle prism and exits from the first opening A. Therefore, the display panel is in a full white display state. By controlling the voltage difference, the deflection direction of the liquid crystal molecules 6 can be controlled, thereby realizing the brightness control to the display panel.

Further, as shown in FIG. 4, the display panel further includes a second light-shielding layer 9. The second light-shielding layer 9 includes a second opening B as a light entrance opening for the pixel unit. An orthogonal projection of the second opening B on the first substrate 1 is within the orthogonal projection of the first opening A on the first substrate 1, such that the light transmitting through the right angle prism all exit from the first opening A. The second opening B can limit the position where the light is incident, thereby achieving better control to the light, and preventing light leakage of the display panel in the full black display state.

In the following, the structure and display principle of the display panel of the embodiment of the present disclosure will be described in detail by taking the normally white display panel with a lens 5 disposed in the light-shielding region of the first light-shielding layer 2 and being a right angle prism as an example.

As shown in FIG. 3, the lens 5 is disposed in the light-shielding region of the first light-shielding layer 2 of the normally white display panel. The normally white display panel has a similar structure with the normally black display panel, but differs from the normally black display panel in that the lens 5 of the normally white display panel is disposed in the light-shielding region of the first light-shielding layer 2. Further, the second substrate 8 of the normally white display panel is provided with the second light-shielding layer 9 and the second opening B, so as to limit the position where the light is incident, and ensure that no light exits from the display panel when in a full black display state, thereby preventing light leakage.

Figure 8:
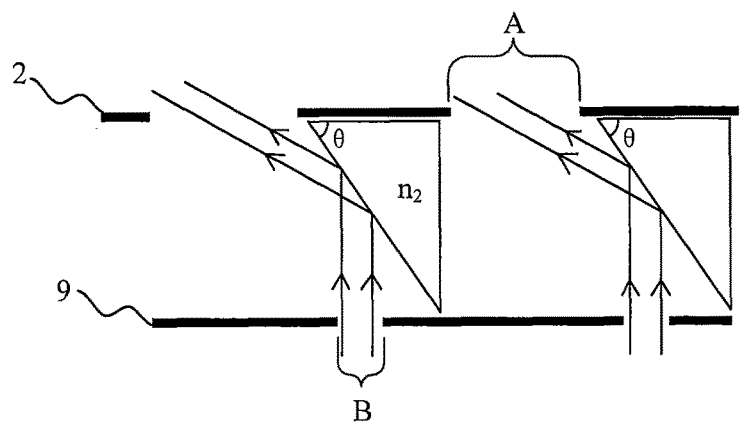
FIG. 8 illustrates light propagation in a display panel that is in a full white display state according to an embodiment of the present disclosure.
Figure 9:
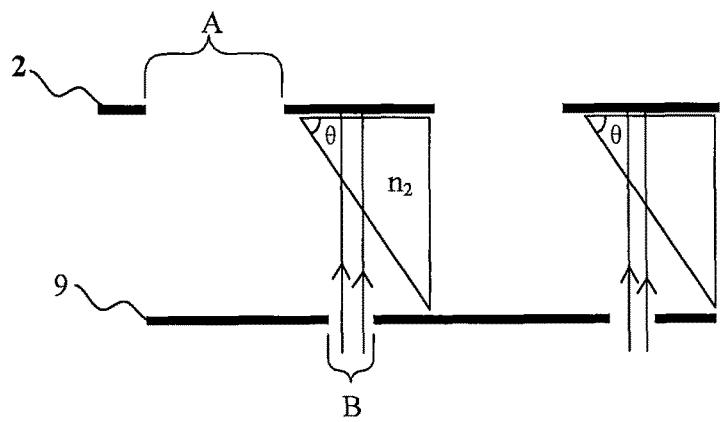
FIG. 9 illustrates light propagation in a display panel that is in a full black display state according to an embodiment of the present disclosure.

For a normally white display panel, when no voltage is applied to the first electrode 4 and the second electrode 10, the liquid crystal molecules 6 are in an initial state where the direction of the long axis of the liquid crystal molecules 6 is parallel to the first substrate 1 and the second substrate 8 as well as the plane (that is, the light incident surface 12) where the hypotenuse of the right angle triangle of the main cross section of the right angle prism is located. The propagation direction of the incident light is perpendicular to the first substrate 1 and the second substrate 8, and the polarization direction of the incident light is parallel to the initial direction of the long axis of the liquid crystal molecules. As shown in FIG. 8, when light reaches the light incident surface 12 of the right angle prism, the refractive index of the liquid crystal layer is equal to the e-light refractive index of the liquid crystal molecules 6, such that the light is totally reflected, and the reflected light exits from the first opening A, thereby achieving full white display. When a voltage is applied to the first electrode 4 and the second electrode 10, the liquid crystal molecules 6 deflect and stand up, so that the refractive index of the liquid crystal layer 11 is equal to the o-light refractive index of the liquid crystal molecules 6. Therefore, as shown in FIG. 9, the light transmits through the right angle prism, and the transmitted light is absorbed by the first light-shielding region, thereby realizing full black display.

It is noted that, for the display panel shown in FIG. 3, since the light exiting surface of the lens corresponds to the first light-shielding layer 2, and the second light-shielding layer 9 is capable of limiting the position where light is incident, both linearly polarized light and natural light are feasible for the display panel. Since light transmitting through the lens can be absorbed by the first light-shielding layer 2, even in case of the natural light, light leakage would not occur to the display panel in the full black display state. In such an embodiment, the display panel may not include any polarizing film, thereby further reducing the manufacturing cost of the display panel and avoiding defects caused during the process of attaching the polarizing film.

If the lens 5 of the display panel is disposed in the light transmitting region of the first light-shielding layer 2, the voltage difference between the first electrode 4 and the second electrode 10 may be adjusted so that the direction of the long axis of the liquid crystal molecules in the liquid crystal layer 6 is not perpendicular to the polarization direction of the incident light for the display panel, and all or part of the light exits from the light exiting surface of the lens 5, thereby achieving a bright display. By adjusting the voltage difference between the first electrode 4 and the second electrode 10 so that the direction of the long axis of the liquid crystal molecules 6 is perpendicular to the exiting direction of the incident light, and the direction of the long axis of the liquid crystal molecules 6 is parallel to the polarization direction of the incident light, therefore, the light is totally reflected at the light incident surface of the lens 5 to realize a full black display.

Figure 7:
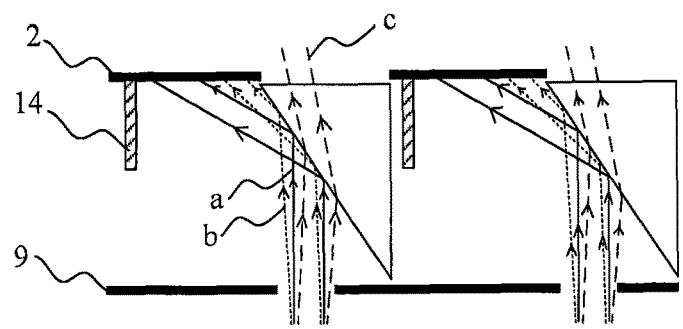
FIG. 7 illustrates light propagation in a display panel that is in a gray scale display state according to an embodiment of the present disclosure.

FIG. 7 illustrates light propagation in the display panel when performing gray scale display. Taking the lens 5 arranged in the light-transmitting region as an example, it is possible that the refractive index of the liquid crystal layer is between the o-light refractive index and e-light refractive index of the liquid crystal molecules 6 by controlling the voltage difference between the first electrode 4 and the second electrode 10. In this way, a part of light (e.g., light as indicated with "b") that is incident onto the light incident surface 12 is totally reflected and then absorbed by the first light-shielding layer, while the other part of the light is refracted at the light incident surface 12 and then exits from the first opening A. By adjusting the voltage difference between the first electrode 4 and the second electrode 10, the deflection angle of the liquid crystal can be adjusted, which in turn adjusts the refractive index of the liquid crystal layer. On this basis, the ratio of total reflection and refraction of light incident onto the interface (that is, the light incident surface 12) between the liquid crystal layer and the lens 5 can be adjusted, thereby realizing the grayscale display of the display panel.

If the lens 5 of the panel display is disposed in the light-shielding region of the first light-shielding layer 2, as shown in FIG. 8, by adjusting the voltage difference between the first electrode 4 and the second electrode 10, the light incident onto the light incident surface 12 is totally reflected and exits from the first light-transmitting region A, thereby realizing a full white display.

In case of full black display, as shown in FIG. 9, by adjusting the voltage difference between the first electrode 4 and the second electrode 10, the refractive index of the liquid crystal layer can be the same as that of the lens 5. Therefore, all light incident onto the light incident surface 12 is transmitted and then absorbed by the first light-shielding layer.

Figure 10:
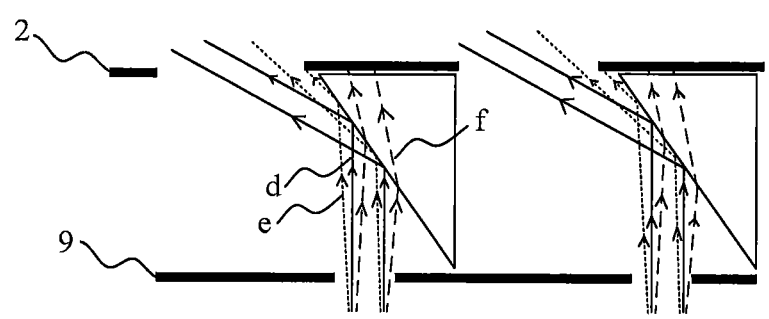
FIG. 10 illustrates light propagation in a display panel that is in a gray scale display state according to an embodiment of the present disclosure.

FIG. 10 illustrates light propagation in the display panel when performing gray scale display. Taking the lens 5 arranged in a non-light transmitting region as an example, it is enabled that the refractive index of the liquid crystal layer is between the o-light refractive index and e-light refractive index of the liquid crystal molecules 6 by controlling the voltage difference between the first electrode 4 and the second electrode 10. In this way, a part of the light (e.g., light as indicated with "d") incident onto the light incident surface 12 is totally reflected and then exits from the first opening A, while the other part of the light is refracted at the light incident surface 12 and hence absorbed by the first light-shielding layer. By adjusting the voltage difference between the first electrode 4 and the second electrode 10, the deflection angle of the liquid crystal can be adjusted, and thus the refractive index of the liquid crystal layer can be adjusted. On this basis, the ratio of total reflection and refraction of light incident onto the interface (that is, the light incident surface 12) between the liquid crystal layer and the lens 5 can be adjusted, thereby realizing the grayscale display of the display panel.

Another embodiment of the disclosure provides a display device including the display panel as described above. The display device may optionally further include a backlight configured to provide linearly polarized light having a polarization direction parallel to an initial direction of the long axis of the liquid crystal molecules. The disclosure does not limit how to form the linearly polarized light. Those skilled in the art are aware of different ways to generate desired linearly polarized light according to actual circumstances, which will not be described herein.

The beneficial effects achieved by the liquid crystal display device provided by the embodiments of the disclosure are similar to the beneficial effects that can be achieved by the display panel provided by the foregoing embodiments, and thus are not repeated herein.

It should be noted that the liquid crystal display device mentioned herein may be of TN (Twisted Nematic) type, MVA (Multi-Domain Vertical Alignment) type, PVA (Patterned Vertical Alignment) type, IPS (In-Plane Switching) type, FFS (Fringe Field Switching) type or ADS (Advanced Super Switch) type, etc.

In addition, the display device in the disclosure may be any product or component having a display function, such as a mobile phone, a tablet computer, a television, a display, a notebook computer, a digital photo frame, a navigator, and the like.

What has been stated above is some embodiments of the disclosure, but the protection scope of the application is not so limited. Variations or modifications that are easily conceived by a person having skilled in the art without departing the disclosure should be encompassed by this disclosure. Therefore, the protection scope of the present disclosure shall be subject to the protection scope of the claims.

The invention claimed is:

1. A display panel comprising a plurality of pixel units, the display panel comprising:

a first substrate and a second substrate opposite to each other, wherein a side of the first substrate facing away from the second substrate is a light exiting side of the display panel, and a side of the second substrate facing away from the first substrate is a light incident side of the display panel;

a first light-shielding layer on the first substrate, the first light-shielding layer comprising a plurality of first openings as light-transmitting regions for the pixel units; and a liquid crystal layer between the first substrate and the second substrate, wherein each pixel unit of the plurality of pixel units comprises a first electrode, a second electrode and a lens that is on a side of the first substrate facing the second substrate and extends toward the second substrate, wherein the lens comprises a light incident surface and a light exiting surface, wherein the light incident surface of the lens is in direct contact with the liquid crystal layer, wherein the first electrode and the second electrode are configured to form an electric field in response to receiving a voltage, and wherein the electric field is configured to drive liquid crystal molecules of the liquid crystal layer to deflect to change a ratio of transmission and reflection of linearly polarized light incident onto the liquid crystal layer at the light incident surface of the lens, thereby changing a ratio of the linearly polarized light exiting from a light-transmitting region of the light-transmitting regions and the linearly polarized light absorbed by the first light-shielding layer.

2. The display panel according to claim 1, wherein the lens is in the light-transmitting region of the pixel unit.

3. The display panel according to claim 2, wherein an orthographic projection of each of the plurality of first openings on the first substrate is within an orthographic projection of the light exiting surface of the lens on the first substrate.

4. The display panel according to claim 2, further comprising:

a second light-shielding layer on a side of the liquid crystal layer facing away from the first substrate, wherein the second light-shielding layer comprises a plurality of second openings, and an orthographic projection of each of the plurality of second openings on the first substrate is within an orthographic projection of each of the plurality of first openings on the first substrate.

5. The display panel according to claim 2, further comprising:

a barrier in a light-shielding region of the first light-shielding layer and extending from the first substrate toward the second substrate, wherein an orthographic projection of the barrier on the first substrate does not overlap with an orthographic projection of the lens on the first substrate.

6. The display panel according to claim 1, wherein the lens is in a light-shielding region of the pixel unit, the display panel further comprises:

a second light-shielding layer on a side of the liquid crystal layer facing away from the first substrate, wherein the second light-shielding layer comprises a plurality of second openings, and wherein an orthographic projection of each of the plurality of second openings on the first substrate is within an orthographic projection of a light-shielding region of the first light-shielding layer on the first substrate.

7. The display panel according to claim 1, wherein the lens comprises any one selected from a group consisting of a cylinder lens, a taper lens and a mesa lens.

8. The display panel according to claim 1, wherein the lens comprises a right angle prism, wherein a main cross section of the right angle prism comprises a right triangle, wherein a plane comprising a hypotenuse of the right triangle of the main cross section of the right angle prism comprises the light incident surface, and wherein a plane comprising a cathetus of the right triangle of the main cross section of the right angle prism that is parallel to the first substrate comprises the light exiting surface.

9. The display panel according to claim 8, wherein an initial direction of a long axial of the liquid crystal molecules is parallel to a plane comprising the hypotenuse of the right triangle of the main cross section of the right angle prism.

10. The display panel according to claim 9, wherein an angle between the light incident surface of the right angle prism and the light exiting surface of the right angle prism is θ, and $$\theta = \arcsin\left(\frac{n_2}{n_e}\right),$$

wherein $n_2$ is a refractive index of the right angle prism, and $n_e$ is an e-light refractive index of liquid crystal molecules in the liquid crystal layer.

11. The display panel according to claim 1, wherein the lens comprises resin or quartz.

12. The display panel according to claim 1, wherein an initial direction of a long axis of the liquid crystal molecules in the liquid crystal layer is parallel to the first substrate, wherein a refractive index $n_1$ of the lens is equal to $n_O$, wherein the $n_O$ is an o-light refractive index of liquid crystal molecules in the liquid crystal layer.

13. The display panel according to claim 12, wherein an angle α between a tangent plane for a point on the light incident surface of the lens and the light exiting surface of the lens satisfies $$\alpha \geq \arcsin\left(\frac{n_1}{n_e}\right)$$

wherein $n_1$ is the refractive index of the lens, and $n_e$ is an e-light refractive index of liquid crystal molecules in the liquid crystal layer.

14. The display panel according to claim 1, wherein the first electrode comprises a common electrode and is connected to a reference voltage, and wherein the second electrode comprises a pixel electrode, and wherein the first electrode is on the first substrate, and the second electrode is on the second substrate.

15. The display panel according to claim 1, wherein the first electrode comprises a common electrode and is connected to a reference voltage, and the second electrode comprises a pixel electrode, and wherein both the first electrode and the second electrode are on one of the first substrate and the second substrate.

16. The display panel according to claim 1, further comprising:
a color filter layer in the light-transmitting region of the first substrate.

17. The display panel according to claim 1, wherein a difference between an e-light refractive index and an o-light refractive index of the liquid crystal molecules in the liquid crystal layer is greater than or equal to 0.3.

18. A display device, comprising the display panel according to claim 1, and a backlight on the side of the second substrate facing away from the first substrate.

19. The display device according to claim 18, wherein the backlight is configured to provide linearly polarized light whose polarization direction is parallel to an initial direction of a long axis of the liquid crystal molecules in the liquid crystal layer.

20. The display device according to claim 18, wherein the lens is in the light-transmitting region of the pixel unit.

* * * * *